UNITED STATES PATENT OFFICE.

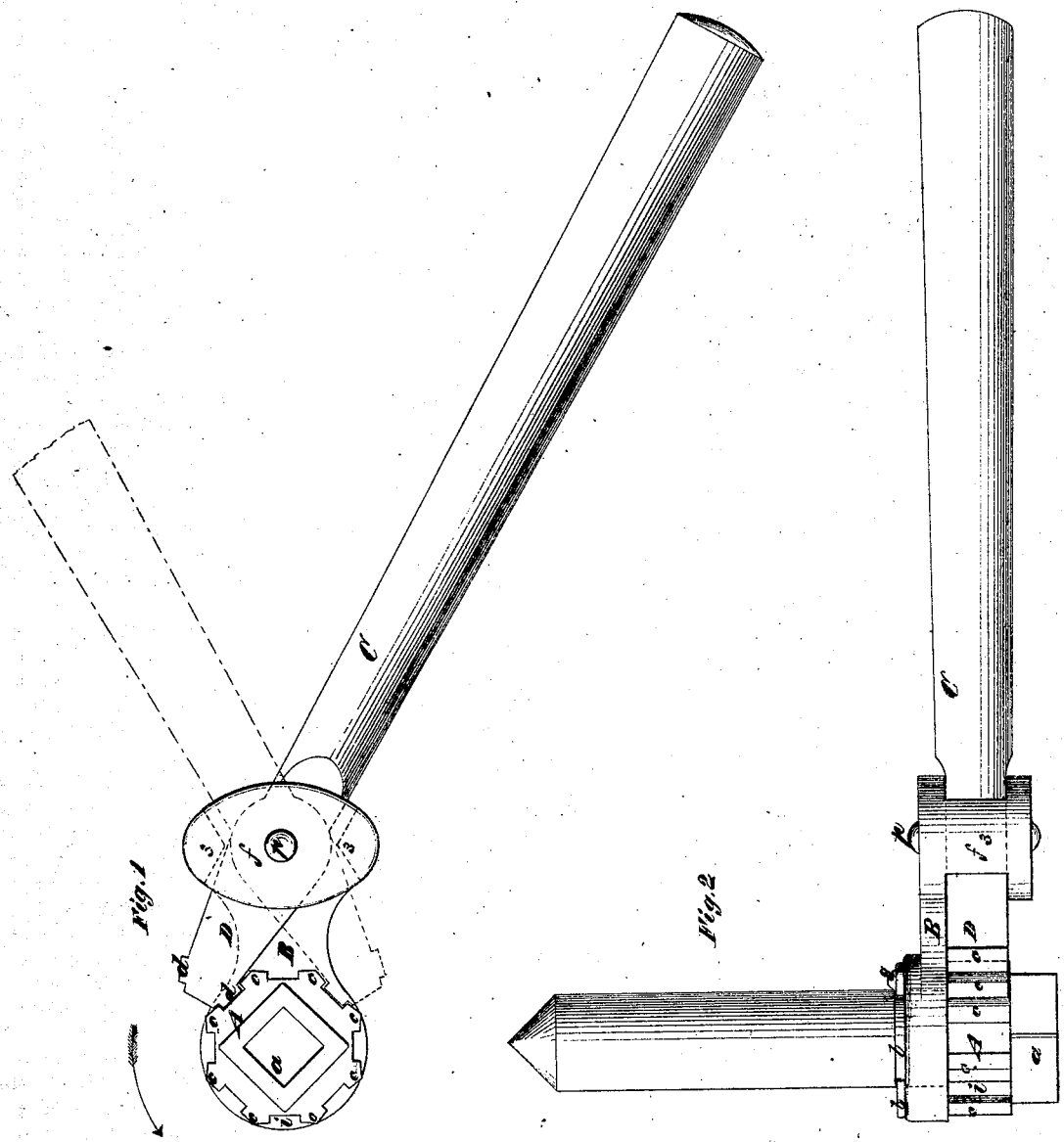

JAMES W. MAHLON, OF BROOKLYN, NEW YORK.

IMPROVEMENT IN RATCHET-DRILLS.

Specification forming part of Letters Patent No. 116,847, dated July 11, 1871.

*To all whom it may concern:*

Be it known that I, JAMES W. MAHLON, of Brooklyn, in the county of Kings and State of New York, have invented a new and Improved Ratchet-Movement; and I do hereby declare that the following is a full, clear, and exact description thereof, reference being had to the accompanying drawing forming a part of this specification.

This invention is applicable to ratchet-wrenches, die-stocks, and other apparatus in which a ratchet-movement is required; and it consists in a novel construction of the ratchet-wheel and pawl, and novel combination therewith of the operating-handle, whereby simplicity, strength, durability, and facility of reversal are obtained.

In the accompanying drawing, Figure 1 is a plan view of a drill-stock with my pawl-and-ratchet motion applied, and Fig. 2 is a side view of the same.

Similar letters of reference indicate corresponding parts in both figures.

A is the ratchet-wheel, formed on or firmly secured to the drill-stock $a$. This wheel is of octagonal form, and has a square-sided recess, $i$, formed in each of its sides, the intermediate projecting portions or angles of the wheel between these recesses forming teeth $c\ c$. The spindle $e$ of the drill-stock is supported in a suitable bearing provided in one end of a yoke, B, and is secured therein by a segmental plate, $b$, which is secured at one end by a screw, $g$, to the side of the yoke B farthest from the ratchet-wheel A, and whose inner edge fits within a groove, $l$, formed around the exterior of the said shank. C is the operating-lever or handle, which is pivoted by a pin, $p$, within a box, $f$, formed on the opposite end of the yoke B to that in which the shank of the drill-stock is received. The end of this lever next the ratchet constitutes a pawl, D, and tapers off from the pivot $p$ to the end, and has there formed on each side a square-sided tooth, $d$, of a size to fit easily within the recesses $i\ i$ in the sides of the ratchet-wheel A.

To operate the ratchet the lever C is worked by the hand alternately in opposite directions. While moving in one direction its pawl-tooth engages with the ratchet-wheel and turns it; but while moving in the opposite direction the pawl-tooth disengages itself from the ratchet-notches and passes over the teeth $c\ c$. The box $f$ in which the lever is pivoted is of such size to prevent the pawl from being thrown out from the ratchet more than is necessary to allow it to pass over the teeth thereof to take a new hold, the end portions 3 3 constituting stops. The pawl and lever, when in the position represented in bold outline in Fig. 1, turn the ratchet in the direction of the arrow; but they may be reversed so as to turn the ratchet in the opposite direction by simply removing the pin $p$, drawing back the lever far enough to allow the end of the pawl to pass the ratchet, and then pushing it forward to gear with the other side thereof. The operation of the lever will be the same as it was in the former position, but the ratchet-wheel will turn in the opposite direction.

This pawl-and-ratchet motion is at once simple and compact, and is very strong and durable, there being no spring necessary to hold the pawl against the wheel, and the teeth and pawl being of such shape as to be free from liability to injury.

The pawl and lever are described as being made in one piece, and it is preferable so to make them, as an essential feature of the invention is their rigid connection so that the pawl forms a part of the lever. The ratchet-wheel represented is of octagonal form. I believe this form to be the best, and it is the most easily made; but the wheel may be of any other polygonal form, according to the desired number of teeth.

What I claim as my invention, and desire to secure by Letters Patent, is—

In combination with the stock or spindle of a drill, the polygonal ratchet-wheel A with rectangular pawl-recesses, the lever C D with its projecting rectangular pawl-teeth, one on each side, and the yoke B, substantially as hereinbefore described.

JAMES W. MAHLON.

Witnesses:
J. W. COOMBS,
FRED HAYNES.